Figure 1:
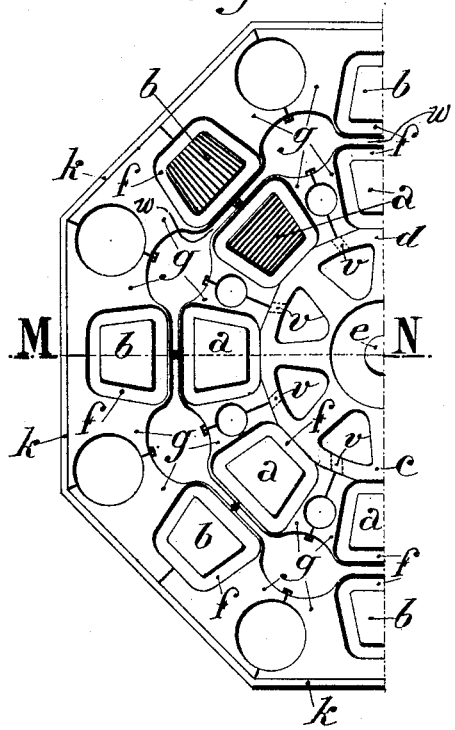

No. 811,154. PATENTED JAN. 30, 1906.
P. A. J. LAPEYRADE.
DYNAMO ELECTRIC MACHINE.
APPLICATION FILED FEB. 8, 1904.

2 SHEETS—SHEET 1.

Witnesses
Henri Blouin
Gustave Auger

Inventor
Pierre Antoine Joseph Lapeyrade

No. 811,154. PATENTED JAN. 30, 1906.
P. A. J. LAPEYRADE.
DYNAMO ELECTRIC MACHINE.
APPLICATION FILED FEB. 8, 1904.
2 SHEETS—SHEET 2.
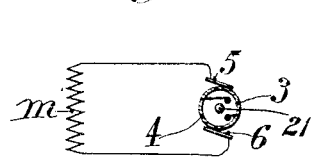
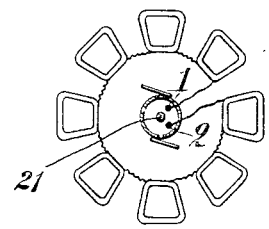
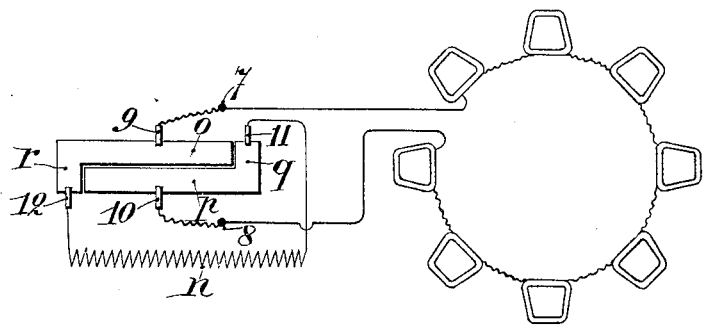
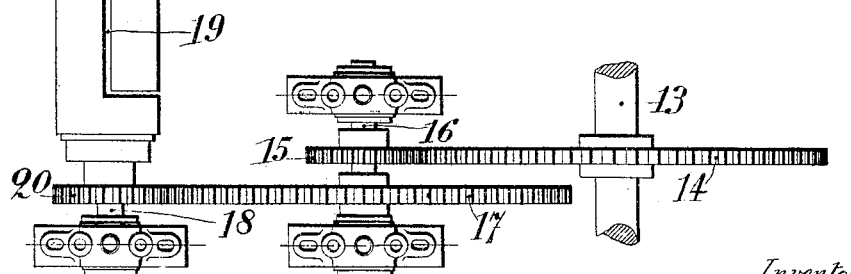

UNITED STATES PATENT OFFICE.

PIERRE ANTOINE JOSEPH LAPEYRADE, OF PARIS, FRANCE.

DYNAMO-ELECTRIC MACHINE.

No. 811,154.  Specification of Letters Patent.  Patented Jan. 30, 1906.

Application filed February 8, 1904. Serial No. 192,691.

*To all whom it may concern:*

Be it known that I, PIERRE ANTOINE JOSEPH LAPEYRADE, a citizen of the Republic of France, residing at 174 Rue Jeanne d' Arc Prolongée, Paris, in the Republic of France, have invented a new and useful Improved Dynamo-Electric Machine, of which the following is a specification.

The dynamo-electric machine which forms the object of this invention possesses the following characteristics: It has a stationary field and possesses this peculiarity, wherein rests the essence of the invention, that it has two armature-windings—one stationary and the other revolving. The two armature-windings are equal and at an equal distance from the poles of the field-magnets which are common to both. Each armature-winding comprises a series of coils wound on cores of soft iron separated from one another by regular intervals. The stationary winding has the cores of its coils always in the fields of the inducing-poles. The moving winding, on the contrary, receives a movement of rotation whereby the cores of its coils are made alternately and during equal periods to approach and recede from the poles of the field-coils. The spaces between the cores of the armature-coils, as also those between the cores of the field-magnet poles, which are equal to one another, are calculated accordingly. A double generation of current is produced, on the one hand, in the moving armature-winding and, on the other, in the stationary armature-winding. Hence I have called the machine "double-acting." The generation of current in the stationary armature-winding takes place in the following manner: When the cores of the revolving armature recede from the field-poles, the lines of force of the magnetic field which they are leaving are absorbed in the cores of the stationary armature. In passing into these cores the lines of force produce in their coils a first induced current the intensity of which increases. As the cores of the revolving armature again come in front of the field-poles they again take in, by the fact of their presence in the magnetic field into which they enter, the lines of force previously thrown out, and these latter consequently again leave the cores of the stationary armature, and their passing out produces in the windings of said stationary cores an induced current opposite to the first and the intensity of which constantly diminishes. The generation of currents in the revolving armature takes place in the following manner: According as the cores of the revolving armature come before the field-poles they take part in the magnetic field they are traversing, and their windings receive an induced current corresponding to the work done in producing the movement.

The double-acting machine which I am about to describe and which effects the practical and industrial realization of my invention is constructed in the following manner: The field consists of two circles or crowns of poles mounted beside one another on the two plates forming the end pieces of the machine. Each crown comprises eight poles, and in the respective crowns the poles are exactly opposite to one another and are of opposite sign. The poles of each respective crown also are alternately of north and south polarity. In the gap separating the opposite sets of poles are situated the two armatures—the revolving armature and the fixed armature. The two armatures stand in the same plane in two concentric circles, each possessing as many coils as the field has pairs of poles. The core of each of the coils lies accurately in the area covered by the masses of the field-poles. The cores of the armature-coils face in the same directions as the cores of the field-poles—that is to say, they have their axes perpendicular to the two plates on which the field-poles are mounted. The windings of the armature-cores, as also those of the field-poles, have their turns in planes perpendicular to the axes of the cores.

The machine is illustrated in the accompanying drawings, in which—

Figure 2:
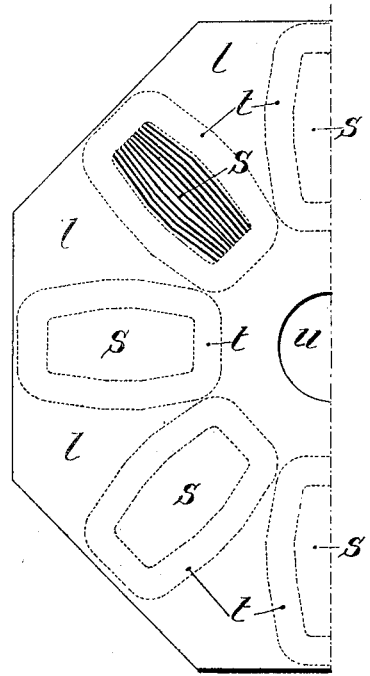
Figure 3:
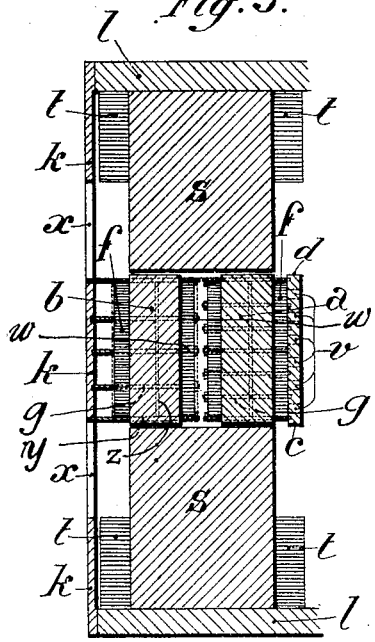
Figure 4:
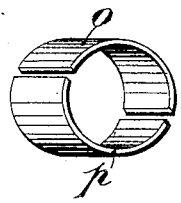
Figure 5:
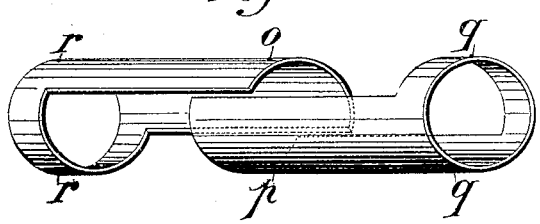

Figure 1 represents, separated out from the machine, half of the two concentric circles of armature-cores. Fig. 2 represents, similarly, half of one of the two plates forming the end pieces of the machine. The field-poles mounted thereon in a crown or circle are shown in dotted lines behind the plate. Fig. 3 represents a section through the centers of two opposite field-poles. In the space between them lie one coil of the stationary armature and one coil of the revolving armature. The section is taken on the line M N of Figs. 1 and 2. Figs. 4 and 5 are isometric views illustrating the principles of commutators, whereby the current produced in the stationary-armature windings may be converted. Figs. 6 and 6ª are diagrams illustrating the circuit connections of the revoluble inner armature. Fig. 7 is a diagram illustrating the circuit connections of the stationary outer armature. Fig. 8 shows the gearing for driving the special commutator.

The same parts appearing in the different figures are designated by the same letters of reference.

It is my intention to describe only the peculiarities constituting the novelty of my machine, leaving the other parts of the machine to be assumed at pleasure according to the rules of science and to current practice.

The revolving armature is mounted on the circumference of the wheel $c\,d$, Figs. 1 and 3, which is in turn driven by the shaft which engages in it at $e$, Fig. 1. The cores $a$ of the coils of the revolving armature are prismatic in shape, Figs. 1 and 3. Their bases are two trapezoids, Fig. 1, which are presented to the faces of the field-poles. These trapezoids have their inclined sides in radii to the circle in which the armature revolves and are calculated in such a way that in this portion of the circle they leave between one another spaces or gaps exactly equal to the spaces occupied by the trapezoids themselves. The cores $a$ are surrounded by the windings of the coils $f$, Figs. 1 and 3. The coils of the movable armature when built up are held in place by clamps or brackets $g$, Figs. 1 and 3. These clamps, which are firmly connected together, are made removable. They help to support one another, leaving, however, between them spaces for the passage of air, Fig. 1. The feet of the clamps or brackets are fitted into the circumference of the wheel $c\,d$ and are suitably held therein by means of screws, for instance. The clamps are prolonged at their outer ends in order to form bars $w$, which extend over the coils of the armature and clasp these latter, Figs. 1 and 3. The clamps are distributed at suitable distances across the breadth of the coils, as is seen in Fig. 3, where the said clamps are indicated in dotted lines. The first and the last clamps embrace the core which projects beyond the coils at $y$, Fig. 3. A shallow groove is formed in the neck of each core in order to facilitate the gripping of the cores by the said clamps. Further, the clamps are connected to one another by transverse bars $z$. (Shown in dotted lines in Fig. 3.) The coils of the movable armature and their cores are thus very closely held in a metallic cage which attaches them to the circumference of the revolving wheel $c\,d$. This cage is made of a non-magnetic cast metal containing about twelve per cent. of manganese.

The cores $b$ of the stationary armature are equal in size to the cores $a$ of the coils in the revolving armature. The windings $f$ are also similar, Figs. 1 and 3. The coils of the stationary armature stand outside those of the revolving armature and in the same plane, Figs. 1 and 3. The trapezoid formed by the base of each core $b$ is reversed relative to the corresponding core $a$, Fig. 1.

The distance between the stationary armature and the revolving armature is calculated so as to leave the minimum clearance necessary for the rotation of the movable part, Figs. 1 and 3.

The coils of the cores of the stationary armature are held in place by a system of clamps or brackets $g$, analogous to those which clasp the revolving armature, Figs. 1 and 3. These clamps, however, are further apart, and consequently fewer in number, Fig. 3. The feet or bases of these clamps are embedded and preferably secured by screws in the plate $k$, Figs. 1 and 3, which connects the side plates $l$ of the machine, Fig. 3. As in the revolving armature, this system of clamps is formed of non-magnetic metal.

The cores of the revolving armature, as also those of the stationary armature, are laminated; but the arrangement of the laminations differs. The cores of the revolving armature have their laminations parallel to the parallel sides of the prisms which they form. The cores of the stationary armature, on the contrary, have their laminations in the same general direction as the non-parallel sides of the prisms which they form, these prisms having for their bases trapezoids the non-parallel sides of which are formed radially. The laminations are also so directed that they meet at the center of the circle of which the sides of the trapezoid are radii. The method of lamination is diagrammatically illustrated in Fig. 1 in the cores of the armature-coils next to the lowest on the right of the figure.

The coils of the revolving armature and those of the stationary armature are separately connected together in series, in parallel, or in multiple arc, according to circumstances, while each armature produces a different current, which is collected separately and supplies a separate circuit.

The collection of the current produced in the coils of the revolving armature is effected in the ordinary manner from the two ends of the windings and is converted to a continuous current, if necessary, by a commutator of ordinary construction mounted on the shaft. As illustrated in Figs. 6 and 6ª, the ends of the coil-winding 1 2 are respectively connected to the half-rings 3 4 of the commutator, which is mounted on the armature-shaft 21, and the current is received by the pair of opposite brushes 5 6, connected to the external circuit $m$. The current produced in the stationary armature is similarly brought to two terminals from the armature-windings; but in consequence of the stationary arrangement of the armature these terminals remain fixed in space. Consequently the current cannot be converted to a continuous current except by a commutator of modified form.

In principal a commutator of usual construction consists in its conducting part of a ring of copper cut into two equal parts $o$ and $p$, Fig. 4. The gaps between the half-rings correspond to the neutral line—that is to say, to the point where the current changes its polarity—if also the two brushes which connect the commutator to the external circuit and which are in contact each with one-half of the split ring change their contact from one-half to the other at the moment when the current is reversed in the coils, and consequently in the half-rings. The external circuit thus receives a succession of current impulses in the same direction or of the same polarity. The following is the method whereby I modify this type of commutator in order to adapt it for the collection and conversion of currents produced in the windings of the stationary armature: Each half of the ring is prolonged, the one part to the right and the other to the left, and two complete rings are made at the two ends, as is shown in Fig. 5. The commutator is, then, composed of two primary half-rings $o$ and $p$ at the center and two secondary rings $q$ and $r$ at the two ends, right and left, respectively. This commutator is mounted on a small separate shaft driven from the armature-shaft by suitable gearing. The connection of the commutator with the armature-windings is shown in Fig. 7. The two primary half-rings $o$ and $p$ are electrically connected, by means of two brushes 9 10, with the ends 7 8 of the windings of the stationary armature. The commutator is rotated at such a speed relative to the armature-shaft that the two brushes change contact each time that the current in the stationary armature changes its polarity. Each primary half-ring $o$ $p$, and consequently each secondary ring $q$ $r$, therefore carries currents always of the same polarity. The secondary rings are connected to the external circuit $n$ by suitable brushes 11 12, and the said circuit consequently receives a succession of current impulses in the same direction or of the same polarity.

In the machine having eight double poles, as described above, the direction of polarity of the current in the stationary armature-circuit changes sixteen times during each complete revolution of the shaft which actuates the revolving armature. Consequently the brushes which rub upon the primary half-rings of the commutator must change the contact sixteen times for each turn of the revolving armature-shaft. The special commutator 19, Fig. 8, for the stationary armature is therefore mounted on a small shaft 18, geared to the shaft 13 of the revolving armature by a suitable gearing so calculated that the subsidiary shaft 18 makes eight turns during the single revolution of the shaft of the revolving armature. In the drawings the gearing consists of a toothed wheel 14 on shaft 13, gearing with a pinion 15 on an intermediate shaft 16 and a toothed wheel 17 on the latter shaft gearing with a pinion 20 on shaft 18. I do not consider it necessary to say more about the commutator proper or to explain, for example, the conditions of electric insulation in which the two parts must be placed. All parts of the apparatus which are not mentioned are to be determined according to current practice, to which, as before stated, inquirers are referred for all accessories not altered by my invention.

I will now proceed to explain the construction of the electromagnetic field.

The cores $s$ of the field-poles correspond in size and shape to those of a pair of armature-coils, as is indicated in Fig. 2, this formation being employed in order that the cores may all be completely included in the electromagnetic field. The field-cores $s$ are surrounded with windings $t$, Figs. 2 and 3. The cores of the field-poles are formed of extra-soft iron. Further, they are laminated. The direction of their laminations is determined by the direction of lamination of the stationary armature-cores to which they correspond, as is shown diagrammatically in Fig. 2 in the electromagnet next to the lowest on the right of the figure. The cores of the field-poles project beyond their windings to such an extent that half of the core is free, Fig. 3. The excitation of the part of the cores inclosed in the windings is never carried to the point of saturation, but as a maximum to demisaturation.

The internal ventilation of the machine is secured in the following manner: The machine is closed on all sides except for a space surrounding the central shaft. An opening $u$ is formed at this place in the side plates $l$, which carry the field-poles. The said opening is larger than that which would be necessary for the free passage of the shaft, Fig. 2. The air enters by this opening, drawn in by the rotation of the revolving armature. A system of channels $v$ presents a passage for this air in traversing the body of the wheel carrying the revolving armature, allowing the air to pass between the clamping-plates adjacent to the coils, Figs. 1 and 3. The air finally escapes from the machine through openings $x$, formed in the plates $k$, connecting the two end plates $l$, Fig. 3. These openings correspond exactly in width to the projecting parts of the cores of the stationary armature and of the field-poles, Fig. 3.

The above is a description of a double-acting machine constructed in accordance with my invention; but I desire to observe further that as the motive force required for the rotation of the revolving armature varies, attaining its maximum when the armature is in the presence of the field-poles and being almost *nil* when the revolving armature is in the intermediate position, it is possible to equalize the absorption of power and to make the movement of rotation more uniform by coupling together two identical machines. Such coupling may be effected by mounting the revolving armatures of the two machines on the same shaft, but in such positions that they stand at an angle the one to the other, so that the cores of one will be passing the front of the field-poles when the cores of the other are in the intermediate position. Moreover, I desire it to be understood that the double-acting machine which I have described is only intended to illustrate my invention, and I do not restrict myself in carrying out the invention to the exact details described. For example, the number of poles employed is entirely optional and has no effect upon the result obtained by the invention. The relative positions of the armature and field-poles is also not an absolutely essential feature.

What I claim is—

1. In a dynamo-electric machine the combination of means for producing a magnetic field, a stationary armature and windings therefor so placed as to always lie in the magnetic field, a revoluble armature and windings therefor adapted to enter and leave the magnetic field during the movement of revolution, and means for supporting the fixed and revoluble parts.

2. In a dynamo-electric machine the combination of a plurality of poles and windings therefor adapted to form a magnetic field, a stationary armature having a corresponding number of poles and windings therefor, said poles so placed as to lie in the magnetic field, a revoluble armature having also a corresponding number of poles and windings therefor, the said poles being adapted to enter and leave the magnetic field during the rotation of the armature, and means for supporting the fixed and revoluble parts.

3. In a dynamo-electric machine the combination of a plurality of poles and windings therefor adapted to form a magnetic field such that the poles stand in a circle and each pole is of opposite sign to the two adjacent poles, a stationary armature having a corresponding number of poles and windings therefor so placed as to lie in the magnetic field, a revoluble armature having also a corresponding number of poles and windings therefor, the said poles adapted to enter and leave the magnetic fields during the rotation of the armature, and means for supporting the fixed and revoluble parts.

4. In a dynamo-electric machine the combination of a pair of end pieces, a plurality of poles mounted to project inwardly in a circle from each end piece in such a way that the poles are opposite one to another with spaces between them, windings on the poles such that when the machine is working the opposite poles shall be of opposite sign, and each pole shall be of opposite sign to those adjacent to it on the same plate, a stationary armature comprising a plurality of cores and windings therefor, one adapted to lie in the field between each pair of field-poles, a revoluble armature having a corresponding number of poles and windings therefor, the said poles adapted to enter and leave the magnetic fields during the rotation of the armature, and means for supporting the fixed and revoluble parts.

5. In a dynamo-electric machine the combination of a pair of end pieces, a plurality of poles mounted to project inwardly in a circle from each end piece in such a way that the poles are opposite one to another with spaces between them, windings on the poles such that when the machine is working the opposite poles shall be of opposite sign, and each pole shall be of opposite sign to those adjacent to it on the same plate, a stationary armature comprising a plurality of cores and windings therefor, one adapted to lie in the field between each pair of field-poles, a revoluble armature having a corresponding number of poles and windings therefor, the said poles adapted to enter and leave the magnetic fields during the rotation of the armature, while the cores of the stationary and revoluble armatures are so shaped that a pair of cores may lie and fit as nearly as possible between the opposite field-poles, and means for supporting the fixed and revoluble parts.

6. In a dynamo-electric machine the combination of two sets of field-magnet poles arranged in circles standing opposite to one another in pairs, a stationary armature comprising a plurality of cores and windings therefor, one adapted to lie in the field between each pair of field-poles, a revoluble armature having a corresponding number of poles and windings therefor, the said poles adapted to enter and leave the magnetic fields during the rotation of the armature, end pieces whereon the field-poles are mounted, plates arranged to circumferentially connect the end pieces, clamps upon said plates adapted to support the cores and coils of the fixed armature and to leave air-spaces between the latter, a wheel-body and clamps thereon adapted to support the cores and coils of the revoluble armature and to leave air-spaces between the latter, and means for admitting the circulation of air from the center of the machine outward.

7. In a dynamo-electric machine the combination of two sets of field-magnet poles arranged in circles standing opposite to one another in pairs, a stationary armature comprising a plurality of cores and windings therefor, one adapted to lie in the field between each pair of field-poles, a revoluble armature having a corresponding number of poles and windings therefor, the said poles adapted to enter and leave the magnetic fields during the rotation of the armature, the cores of the field-poles and of the armatures being laminated, those of the field-poles and of the stationary armature in a substantially radial direction and those of the revoluble armature in a substantially circumferential direction, and means for supporting the fixed and revoluble parts.

8. In a dynamo-electric machine the combination of a plurality of poles and windings therefor adapted to form a magnetic field, a stationary armature having a corresponding number of poles and windings therefor, said poles so placed as to lie in the magnetic field, a revoluble armature having also a corresponding number of poles and windings therefor, the said poles being adapted to enter and leave the magnetic field during the rotation of the armature, means for supporting the fixed and revoluble parts, and a commutator comprising two rings adapted to distribute current to the external circuit of the machine, and a partial ring in connection with each said ring, stationary brushes adapted to convey current from the armature-windings to said partial rings, and means for conveying motion for rotating the commutator from the revolving armature, whereby the commutator is rotated at such speed that the brush-contacts are changed at each change of polarity in the armature-windings, and means for supporting the fixed and revoluble parts of the machine.

In testimony whereof I have signed my name to this specification in the presence of two subscribing witnesses.

PIERRE ANTOINE JOSEPH LAPEYRADE.

Witnesses:
CHARLES PETIGRAV,
HANSON C. COXE.